(12) United States Patent
McBennett

(10) Patent No.: US 6,528,753 B2
(45) Date of Patent: Mar. 4, 2003

(54) METHOD OF COATING AN EMISSIVE ELEMENT

(75) Inventor: Michael C. McBennett, Lamar, SC (US)

(73) Assignee: The ESAB Group, Inc., Florence, SC (US)

(*) Notice: Subject to any disclaimer, the term of this patent is extended or adjusted under 35 U.S.C. 154(b) by 97 days.

(21) Appl. No.: 09/870,950

(22) Filed: May 31, 2001

(65) Prior Publication Data

US 2002/0179578 A1 Dec. 5, 2002

(51) Int. Cl.[7] ............................................. B23K 10/00
(52) U.S. Cl. .............. 219/121.52; 219/119; 219/121.59
(58) Field of Search ..................... 219/121.59, 121.52, 219/121.48, 74, 75, 119; 313/231.31, 231.41

(56) References Cited

U.S. PATENT DOCUMENTS

| | | |
|---|---|---|
| 3,198,932 A | 8/1965 | Weatherly |
| 3,930,139 A | 12/1975 | Bykhovsky et al. |
| 4,056,644 A | 11/1977 | Howard et al. |
| 4,304,984 A | 12/1981 | Bolotnikov et al. |
| 4,749,594 A | 6/1988 | Malikowski et al. |
| 4,766,349 A | 8/1988 | Johansson et al. |
| 4,843,206 A | 6/1989 | Azuma et al. |
| 5,021,627 A | 6/1991 | Bersch et al. |
| 5,023,425 A | 6/1991 | Severance, Jr. |
| 5,097,111 A | 3/1992 | Severance, Jr. |
| 5,200,594 A | 4/1993 | Okada et al. |
| 5,628,924 A | 5/1997 | Yoshimitsu et al. |
| 5,676,864 A | 10/1997 | Walters |
| 5,767,478 A | 6/1998 | Walters |
| 5,776,556 A | 7/1998 | Lazarov et al. |
| 5,851,678 A | 12/1998 | Hasz et al. |
| 5,857,888 A | 1/1999 | Tada et al. |
| 5,908,567 A | 6/1999 | Sakuragi et al. |
| 5,951,888 A * | 9/1999 | Oakley .................. 219/121.52 |
| 6,020,572 A | 2/2000 | Marner et al. |
| 6,066,827 A | 5/2000 | Nemchinsky |
| 6,433,300 B1 * | 8/2002 | McBennett ............ 219/121.52 |

OTHER PUBLICATIONS

Cross-sectional view of an Electrode.
Osamu Taguchi, Yoshiaki Iijima; Reaction diffusion in the silver–hafnium system; Journal of Alloys and Compounds 226 (1995) 185–189; Sendai, Japan.

* cited by examiner

*Primary Examiner*—Mark Paschall
(74) *Attorney, Agent, or Firm*—Alston & Bird LLP

(57) ABSTRACT

An electrode for a plasma arc torch and method of fabricating the same are disclosed, wherein the electrode comprises a metallic holder defining a cavity in a forward end. An emissive element and separator assembly is positioned in the cavity. The emissive element has a layer of relatively non-emissive material on the outer surface thereof, which is preferably applied by heating the emissive element to a high temperature such that the emissive element becomes reactive, and spraying the relatively non-emissive material on the emissive element. The coated emissive element is positioned in the separator and the assembly is heated such that the relatively non-emissive material forms a strong bond between with the separator. The superior bonds between the emissive element and separator formed according to the present invention extend the life span of the electrode.

22 Claims, 7 Drawing Sheets

METHOD OF COATING AN EMISSIVE ELEMENT

FIELD OF THE INVENTION

The present invention relates to plasma arc torches and, more particularly, to an electrode for supporting an electric arc in a plasma arc torch.

BACKGROUND OF THE INVENTION

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex flow of gas, and in some torch designs it is conventional to also envelop the gas and arc with a swirling jet of water.

The electrode used in conventional torches of the described type typically comprises a metallic tubular member composed of a material of high thermal conductivity, such as copper or a copper alloy. The forward or discharge end of the tubular electrode includes a bottom end wall having an emissive insert embedded therein which supports the arc. The insert is composed of a material which has a relatively low work function, which is defined in the art as the potential step, measured in electron volts (ev), which permits thermionic emission from the surface of a metal at a given temperature. In view of its low work function, the insert is thus capable of readily emitting electrons when an electrical potential is applied thereto. Commonly used emissive materials include hafnium, zirconium, tungsten, and their alloys.

A problem associated with torches of the type described above is the short service life of the electrode, particularly when the torch is used with an oxidizing gas, such as oxygen or air. More specifically, the emissive insert erodes during operation of the torch, such that a cavity or hole is defined between the emissive insert and the metallic holder. When the cavity becomes large enough, the arc "jumps" or transfers from the emissive insert to the holder, which typically destroys the electrode. To prevent or at least impede the arc from jumping to the metallic holder, some electrodes include a relatively non-emissive separator that is disposed between the emissive insert and the metallic holder. Separators are disclosed in U.S. Pat. No. 5,097,111, which is assigned to the assignee of the present invention and incorporated herein by reference.

Several methods of securing the emissive insert to the separator have been developed. One method disclosed in the '111 patent is to press or force fit the emissive insert in the separator. Another method disclosed in the '111 patent is metallurgically bonding the separator and the metallic holder by way of a brazing material. In one embodiment, the brazing material is in the form of a disc that is melted between the separator and the metallic holder.

U.S. Pat. No. 3,198,932 also discloses a brazing process, wherein a zirconium insert is brazed into a silver holder. Specifically, the '932 patent discloses a method whereby the insert is first dipped in molten silver, which applies a coating of silver to the insert. Silver is also melted in a cavity or recess defined by the silver holder, and the coated insert is inserted into the recess such that the molten silver flows around the insert. However, the brazing techniques described by the '932 patent require a substantial amount of silver to fabricate the coating and/or holder, which significantly increases the cost of the electrode. Thus, there is a need to further improve the overall cost of manufacturing electrodes.

U.S. Pat. No. 5,857,888 attempts to improve upon the '932 and '425 patents by providing a method of manufacturing an electrode that includes depositing a metal by physical vapor deposition to form a coating on the emissive insert and securing the coated insert in a recess defined by a holder. The coating has a thickness of 1–10 $\mu$m, which is formed by generating vapor particles in a closed environment and allowing the particles to migrate to the surface of the emissive insert. The coated emissive insert is then fitted in the holder without a separator such that the cost of manufacturing the electrode is relatively cheaper than the cost of manufacturing an electrode pursuant to the '932 and '425 patents.

However, the vapor deposition process advocated by the '888 patent does not adequately address the problem of the arc "jumping" or transferring from the emissive insert or element to the metallic holder. Specifically, the extremely thin vapor deposition coating will not provide an adequate barrier for preventing the arc from jumping to the metallic holder, which typically destroys the electrode.

Another problem with vapor deposition is that the bond between the emissive insert and vapor deposition coating is not particularly strong. For example, some materials used to form the emissive element, such as hafnium, do not bond easily with other materials. As such, electrodes with weak bonds between the emissive element and the separator or metallic holder have shorter life spans, which increases the overall operational cost of the plasma arc torch. Thus, there is a need to form a coating about an emissive element that is securely bonded thereto, and that provides a sufficient surface for bonding with adjacent components of the electrode such that the electrode has a longer life span.

SUMMARY OF THE INVENTION

The present invention was developed to improve upon conventional electrodes and methods of making electrodes, and more particularly to improve upon electrodes and methods of making electrodes disclosed in the above-referenced '888 and '932 patents. It has been discovered that the difficulties of the electrodes described above, namely providing an emissive element that is more securely bonded to the adjacent components of the electrode, can be overcome by heating the emissive element to very high temperatures such that the outer surface of the emissive element becomes reactive before applying a relatively non-emissive material to the outer surface of the emissive element. For example, when using hafnium for the emissive element, the element can be heated up to about 4000° F. and relatively non-emissive materials, such as silver, will bond thereto extremely securely.

In one embodiment, the relatively non-emissive material is sprayed on the outer surface of the emissive element. And because the emissive element is at a relatively high temperature, the relatively non-emissive material melts substantially upon contacting the outer surface of the emissive element. The relatively non-emissive material thus forms an advantageously strong bond with the outer surface of the emissive element compared to conventional methods.

In one embodiment, the emissive element having the relatively non-emissive material applied thereto is positioned in a cavity defined by a relatively non-emissive separator. In a preferred embodiment, the relatively non-emissive material is substantially similar to the material forming the separator, such that the resulting coating of relatively non-emissive material on the emissive element and the separator can be easily bonded together, such as by heating the emissive element and the separator to the melting point of the relatively non-emissive material.

Thus, the methods of the present invention provide an important improvement in the art by enhancing the bond between the emissive element and the separator. Prior methods of coating an emissive element using vapor deposition attempt to use a thin coating of metal between the emissive element and the separator. This vapor deposition process, however, is complicated, expensive, and does not lend itself well to mass production. The present invention, however, provides a strong bond between the emissive element and the relatively non-emissive material by applying the material while the emissive element is hot and the surface of the emissive element is reactive. In this state, the emissive element and the relatively non-emissive material form a strong bond therebetween. In addition, the coated emissive element can then form a strong bond with the separator in the electrode compared to conventional methods. In this regard, the methods of the present invention provide bonds that add strength and life span to the electrode of the present invention while using conventional manufacturing equipment and techniques.

BRIEF DESCRIPTION OF THE DRAWINGS

Figure 1:
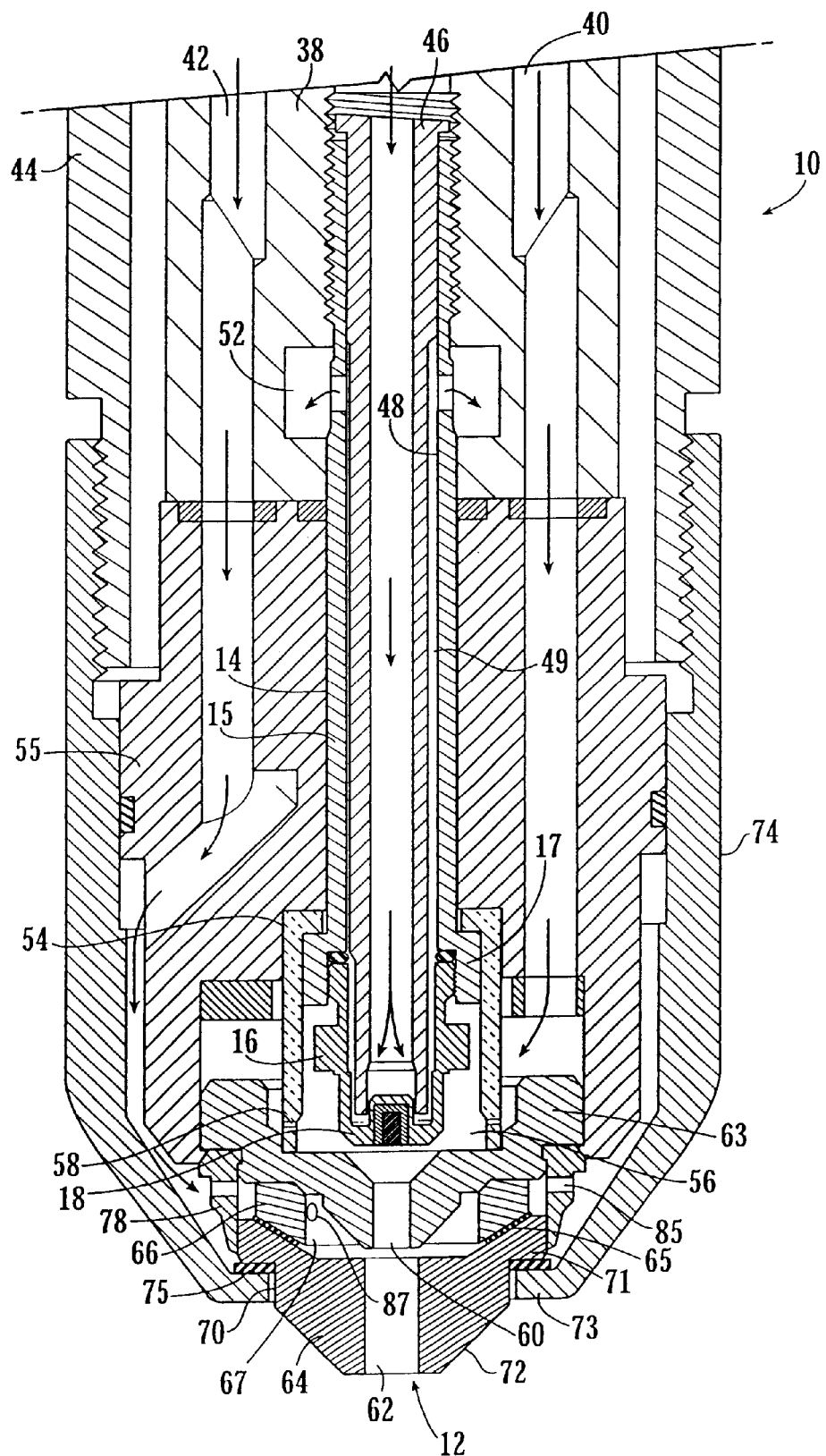
Figure 2:
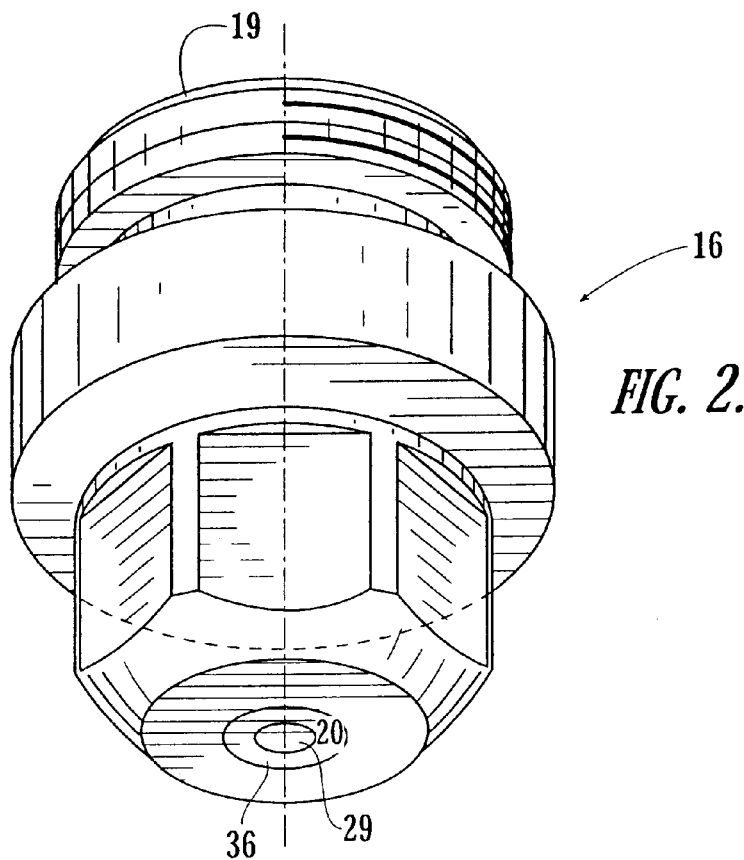
Figure 3:
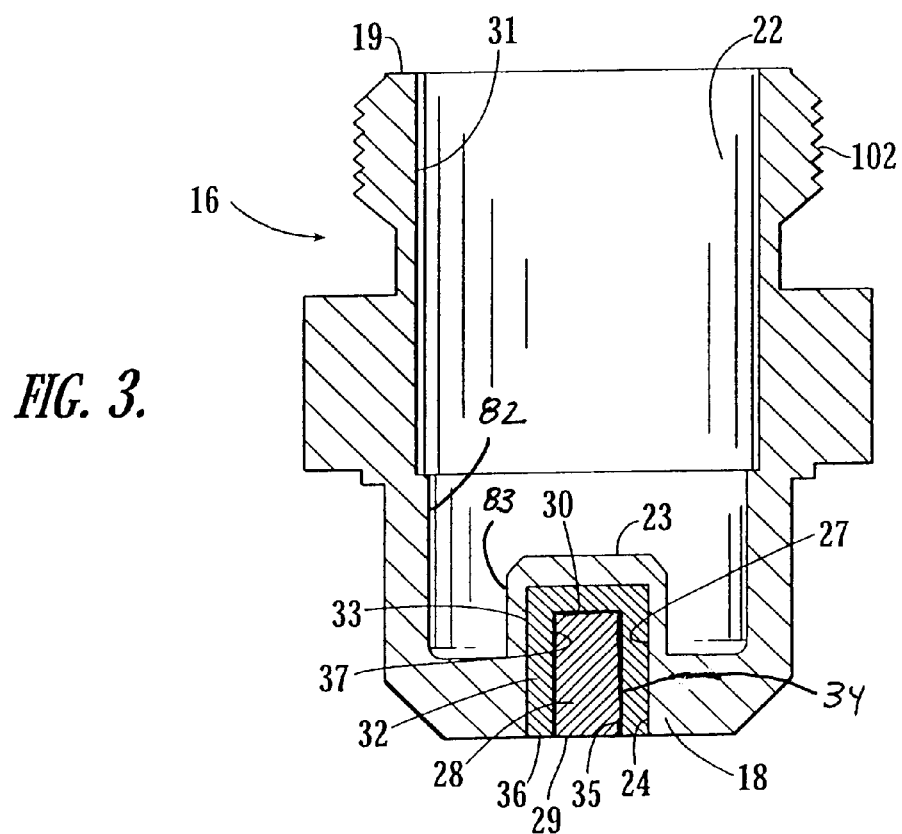
Figure 8:
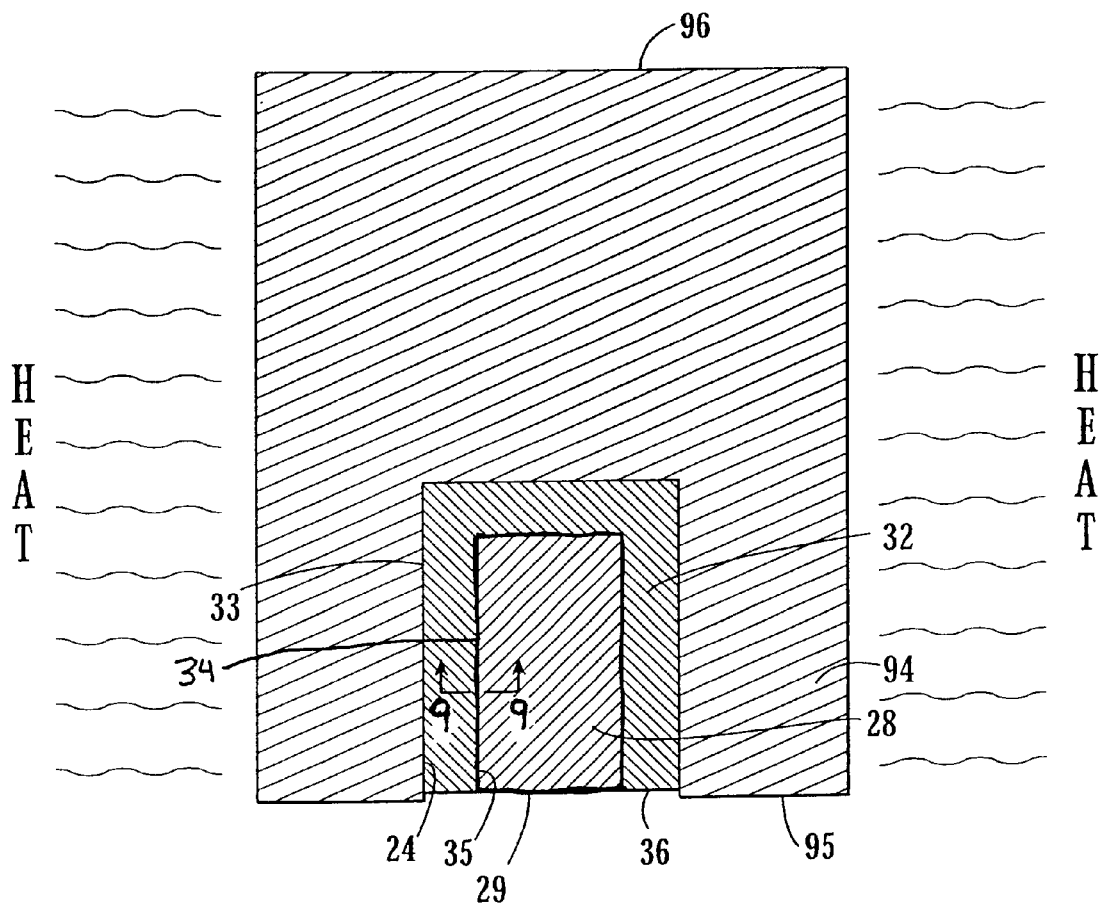
Figure 9:
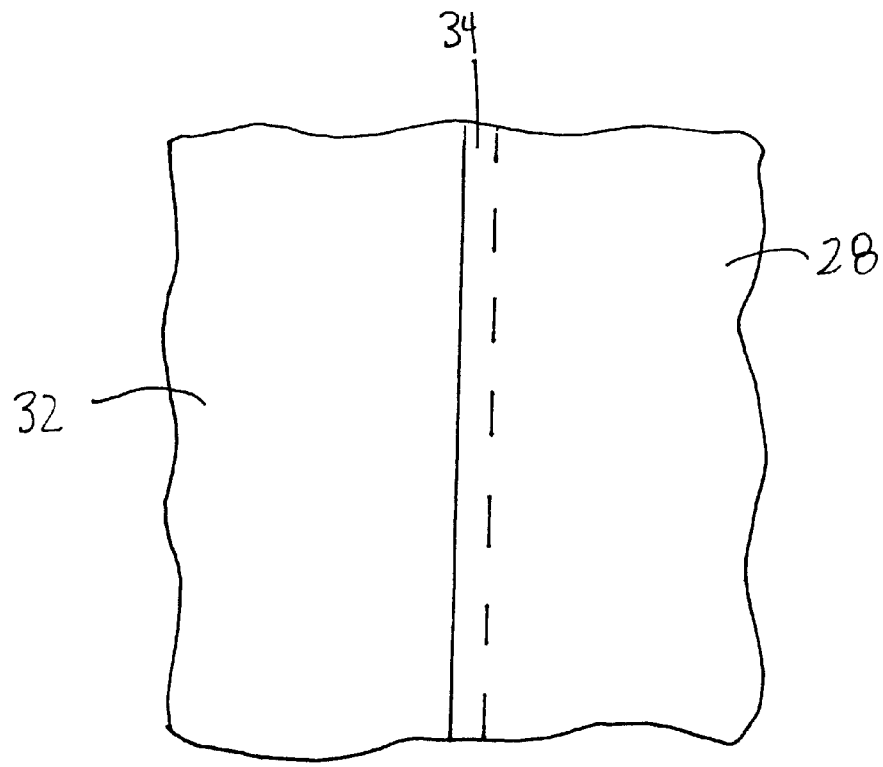
Figure 10:
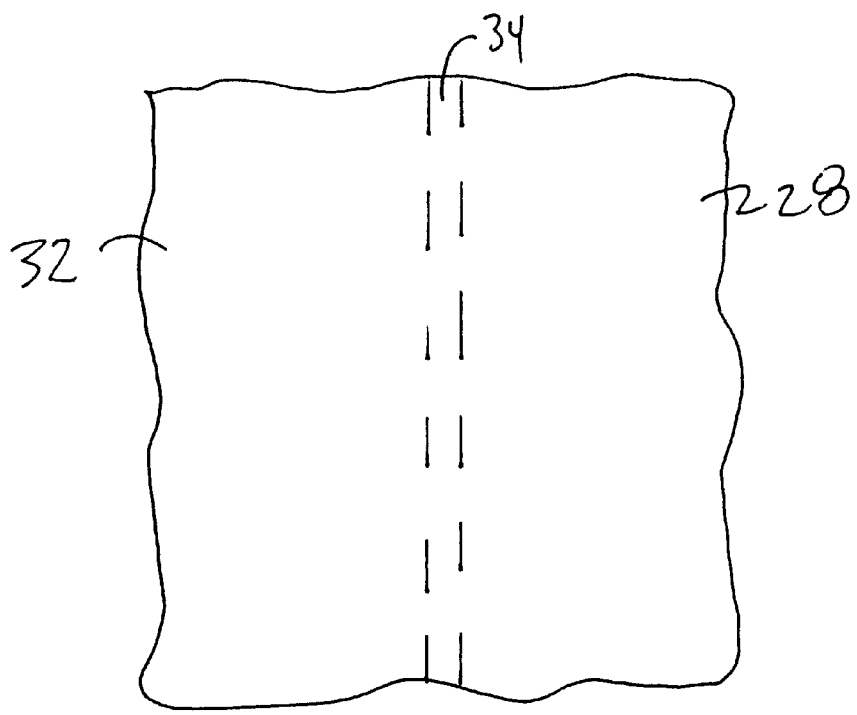
Figure 11:
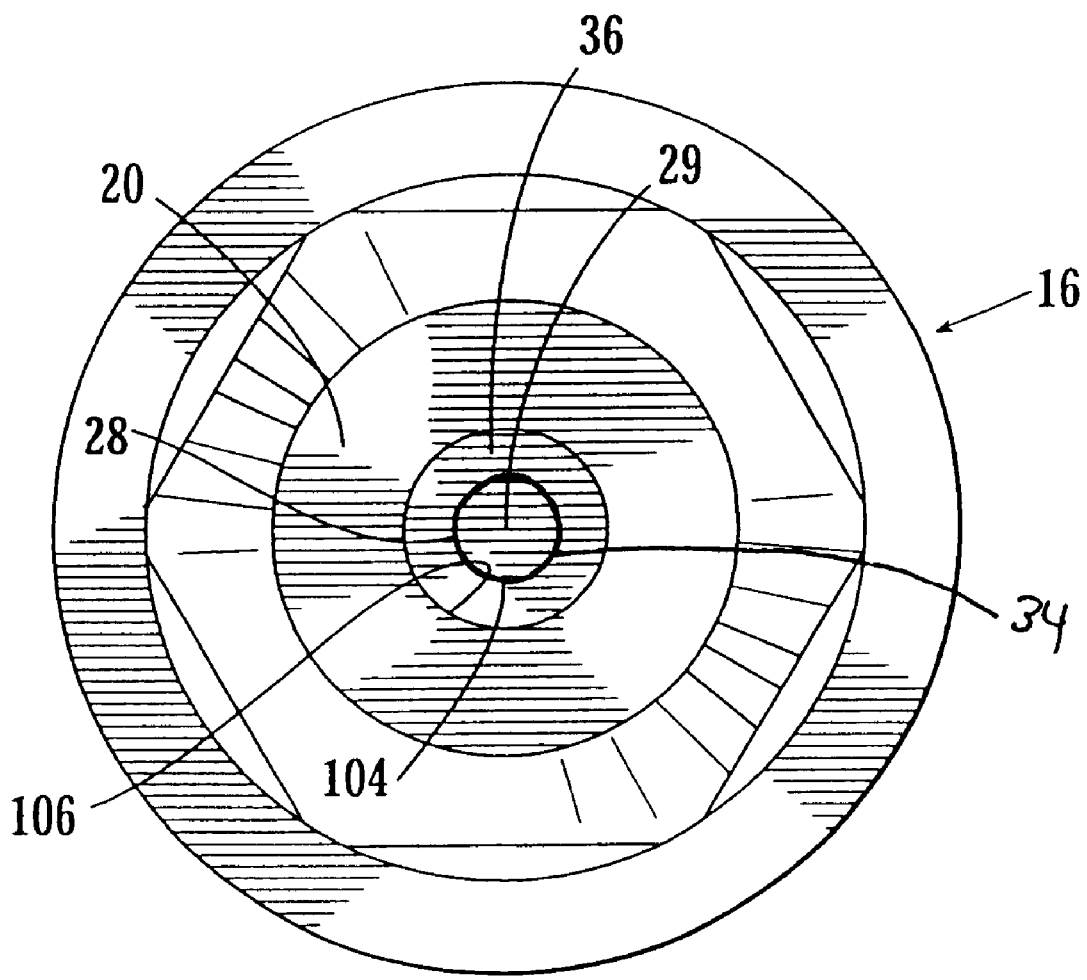

Having thus described the invention in general terms, reference will now be made to the accompanying drawings, which are not necessarily drawn to scale, wherein:

FIG. 1 is a sectioned side elevational view of a plasma arc torch which embodies the features of the present invention;

FIG. 2 is an enlarged perspective view of an electrode in accordance with the present invention;

FIG. 3 is an enlarged sectional side view of an electrode in accordance with the present invention;

FIGS. 4–8 are schematic views illustrating the steps of a preferred method of fabricating the electrode in accordance with the invention;

FIG. 9 is a greatly enlarged sectional view of the electrode of the present invention as seen along lines 9—9 of FIG. 8 shortly before the pressing and heating operations;

FIG. 10 is a greatly enlarged sectional view of the electrode of the present invention as seen along lines 9—9 of FIG. 8 shortly after the pressing and heating operations; and FIG. 11 is an end elevational view of the finished electrode in accordance with the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

With reference to FIGS. 1–3, a plasma arc torch 10 embodying the features of the present invention is depicted. The torch 10 includes a nozzle assembly 12 and a tubular electrode 14. The electrode 14 preferably is made of copper or a copper alloy, and is composed of an upper tubular member 15 and a lower cup-shaped member or holder 16. The upper tubular member 15 is of elongate open tubular construction and defines the longitudinal axis of the torch 10. The upper tubular member 15 includes an internally threaded lower end portion 17. The holder 16 is also of tubular construction, and includes a lower front end and an upper rear end. A transverse end wall 18 closes the front end of the holder 16, and the transverse end wall 18 defines an outer front face 20. The rear end of the holder 16 is externally threaded and is threadedly joined to the lower end portion 17 of the upper tubular member 15.

The holder 16 is open at the rear end 19 thereof such that the holder is of cup-shaped configuration and defines an internal cavity 22. The internal cavity 22 has a surface 31 that includes a cylindrical post 23 extending into the internal cavity along the longitudinal axis. A generally cylindrical cavity 24 is formed in the front face 20 of the end wall 18 and extends rearwardly along the longitudinal axis and into a portion of the holder 16. The cavity 24 includes inner side surface 27.

A relatively non-emissive separator 32 is positioned in the cavity 24 and is disposed coaxially along the longitudinal axis. The separator 32 has an outer peripheral wall 33 extending substantially the length of the cavity 24. The peripheral wall 33 is illustrated as having a substantially constant outer diameter over the length of the separator, although it will be appreciated that other geometric configurations would be consistent with the scope of the invention, such as frustoconical. The separator 32 also defines an internal cavity 35 having a surface 37. The separator 32 also includes an outer end face 36 which is generally flush with the front face 20 of the holder 16.

An emissive element or insert 28 is positioned in the separator 32 and is disposed coaxially along the longitudinal axis. More specifically, the emissive element 28 and the separator 32 form an assembly wherein the emissive element is secured to the separator by an interference or press fit coupled with an advantageous form of bonding, which is effected by heating the emissive element and separator, as discussed more fully below. The emissive element 28 is composed of a metallic material capable of readily emitting electrons upon an electrical potential being applied thereto. Suitable examples of such materials are hafnium, zirconium, tungsten, and mixtures thereof.

The emissive element 28 has a circular outer end face 29 lying in the plane of the front face 20 of the holder 16 and the outer end face 36 of the separator 32. The emissive element 28 also includes a generally circular inner end face 30 which is disposed in the cavity 35 defined by the separator 32 and is opposite the outer end face 29. The inner end face 30, however, can have other shapes, such as pointed, polygonal, or spherical, in order to assist in securing the emissive element to the separator 32. In addition, the diameter of the emissive element 28 is about 30–80 percent of the outer diameter of the end face 36 of the separator 32, which has a radial thickness of at least about 0.25 mm (0.01 inch) at the outer end face 36 and along its entire length. As a specific example, the emissive element 28 typically has a diameter of about 0.08 inch and a length of about 0.25 inch, and the outer diameter of the separator 32 is about 0.25 inch.

Advantageously, the emissive element 28 has a layer or coating of a relatively non-emissive material 34 such that the relatively non-emissive material is interposed between the emissive element and the cavity 35 defined by the separator 32. In one embodiment, the material 34 has a thickness of at least about 0.002 inches, and preferably has a thickness of about 0.002–0.010 inches. The material 34 is selected from a material that does not readily emit electrons when an electrical potential is applied thereto. Examples of such materials are silver, gold, platinum, rhodium, iridium, palladium, nickel, aluminum, and alloys thereof. In a preferred embodiment, the material 34 is formed from sterling silver. As discussed more fully below, the material 34 is securely bonded to the emissive element 28 as well as to the separator 32. Advantageously, the material 34 provides for stronger bonding between the emissive element 28 and the separator 32 compared to conventional methods, such as press-fitting and brazing.

The separator 32 is composed of a metallic material that less readily supports the arc compared to the holder 16 and the emissive element 28. In a preferred embodiment, the separator 32 comprises silver, although other metallic materials, such as gold, platinum, rhodium, iridium, palladium, nickel, and alloys thereof, may also be used. The selected material for the separator 32 should have high thermal conductivity, high resistance to oxidation, high melting point, high work function, and low cost. Although it is difficult to maximize all of these properties in one material, silver is preferred due to its high thermal conductivity. Preferably, the materials forming the separator 32 and the relatively non-emissive material 34 are substantially similar.

For example, in one particular embodiment of the present invention, the material 34 and the separator 32 are composed of a silver alloy material comprising silver alloyed with about 0.25 to 10 percent of an additional material selected from the group consisting of copper, aluminum, iron, lead, zinc, and alloys thereof, such as, for example, sterling silver. The additional material may be in elemental or oxide form, and thus the term "copper" as used herein is intended to refer to both the elemental form as well as the oxide form, and similarly for the terms "aluminum" and the like. With reference again to FIG. 1, the electrode 14 is mounted in a plasma torch body 38, which includes gas and liquid passageways 40 and 42, respectively. The torch body 38 is surrounded by an outer insulated housing member 44. A tube 46 is suspended within the central bore 48 of the electrode 14 for circulating a liquid cooling medium, such as water, through the electrode 14. The tube 46 has an outer diameter smaller than the diameter of the bore 48 such that a space 49 exists between the tube 46 and the bore 48 to allow water to flow therein upon being discharged from the open lower end of the tube 46. The water flows from a source (not shown) through the tube 46, inside the internal cavity 22 and the holder 16, and back through the space 49 to an opening 52 in the torch body 38 and to a drain hose (not shown). The passageway 42 directs injection water into the nozzle assembly 12 where it is converted into a swirling vortex for surrounding the plasma arc, as further explained below. The gas passageway 40 directs gas from a suitable source (not shown), through a gas baffle 54 of suitable high temperature material into a gas plenum chamber 56 via inlet holes 58. The inlet holes 58 are arranged so as to cause the gas to enter in the plenum chamber 56 in a swirling fashion. The gas flows out of the plenum chamber 56 through coaxial bores 60 and 62 of the nozzle assembly 12. The electrode 14 retains the gas baffle 54. A high-temperature plastic insulator body 55 electrically insulates the nozzle assembly 12 from the electrode 14.

The nozzle assembly 12 comprises an upper nozzle member 63 which defines the first bore 60, and a lower nozzle member 64 which defines the second bore 62. The upper nozzle member 63 is preferably a metallic material, and the lower nozzle member 64 is preferably a metallic or ceramic material. The bore 60 of the upper nozzle member 63 is in axial alignment with the longitudinal axis of the torch electrode 14. The lower nozzle member 64 is separated from the upper nozzle member 63 by a plastic spacer element 65 and a water swirl ring 66. The space provided between the upper nozzle member 63 and the lower nozzle member 64 forms a water chamber 67.

The lower nozzle member 64 comprises a cylindrical body portion 70 that defines a forward or lower end portion and a rearward or upper end portion, with the bore 62 extending coaxially through the body portion 70. An annular mounting flange 71 is positioned on the rearward end portion, and a frustoconical surface 72 is formed on the exterior of the forward end portion coaxial with the second bore 62. The annular flange 71 is supported from below by an inwardly directed flange 73 at the lower end of the cup 74, with the cup 74 being detachably mounted by interconnecting threads to the outer housing member 44. A gasket 75 is disposed between the two flanges 71 and 73.

The bore 62 in the lower nozzle member 64 is cylindrical, and is maintained in axial alignment with the bore 60 in the upper nozzle member 63 by a centering sleeve 78 of any suitable plastic material. Water flows from the passageway 42 through openings 85 in the sleeve 78 to the injection ports 87 of the swirl ring 66, which injects the water into the water chamber 67. The injection ports 87 are tangentially disposed around the swirl ring 66, to impart a swirl component of velocity to the water flow in the water chamber 67. The water exits the water chamber 67 through the bore 62.

A power supply (not shown) is connected to the torch electrode 14 in a series circuit relationship with a metal workpiece, which is usually grounded. In operation, a plasma arc is established between the emissive element 28 of the electrode, which acts as the cathode terminal for the arc, and the workpiece, which is connected to the anode of the power supply and is positioned below the lower nozzle member 64. The plasma arc is started in a conventional manner by momentarily establishing a pilot arc between the electrode 14 and the nozzle assembly 12, and the arc is then transferred to the workpiece through the bores 60 and 62.

METHOD OF FABRICATION

Figure 4:
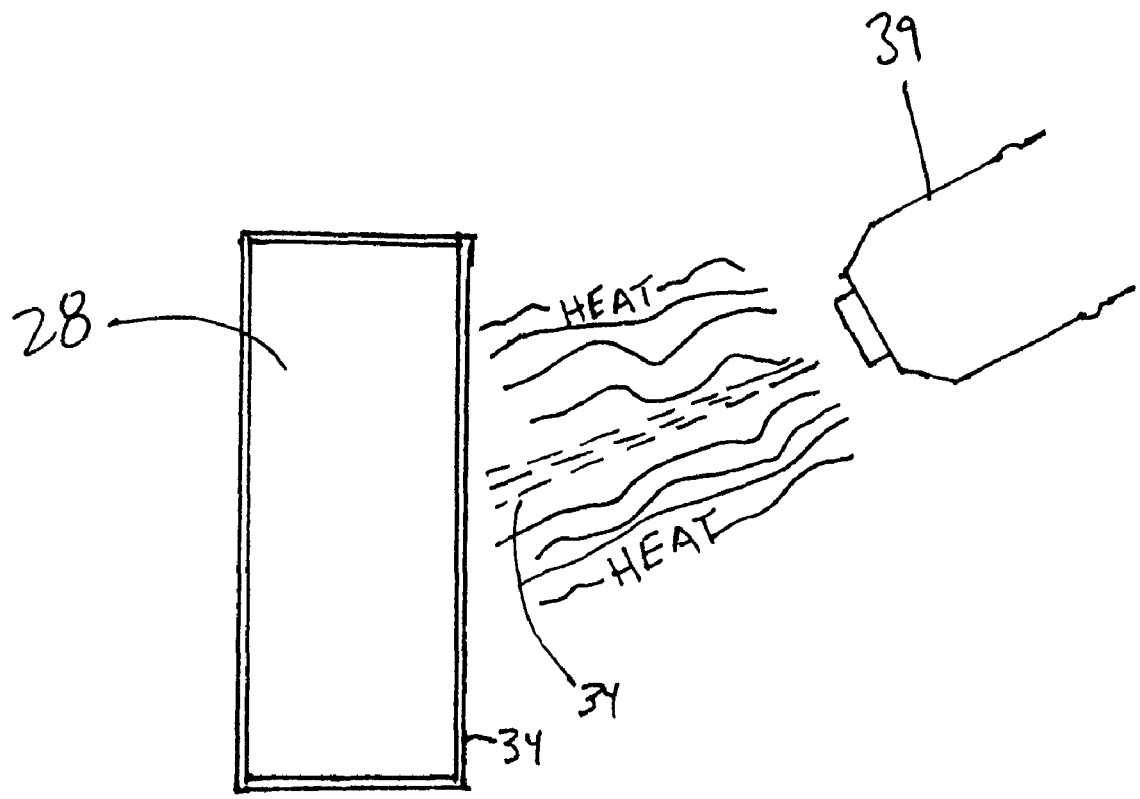
Figure 5:
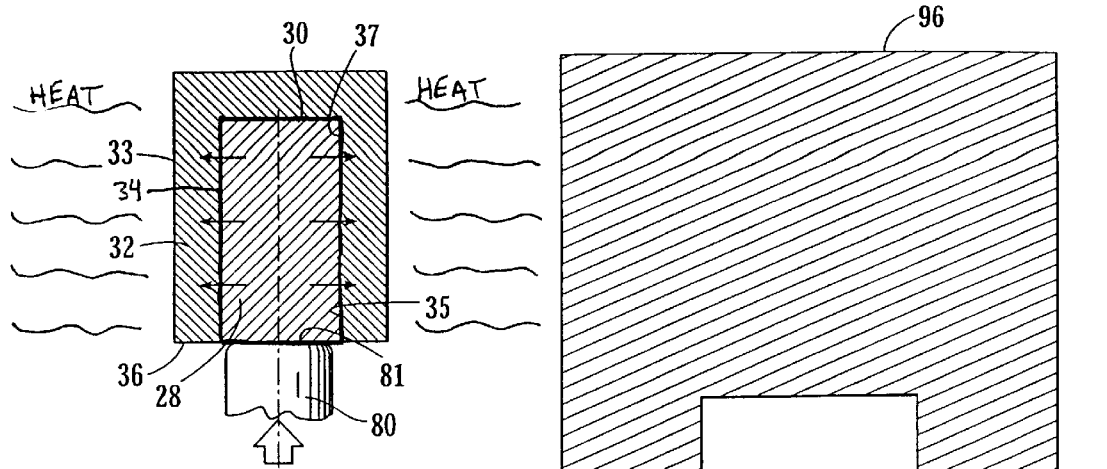

The invention also provides a simplified method for fabricating an electrode of the type described above. FIGS. 4–8 illustrate a preferred method of fabricating the electrode in accordance with the present invention. As shown in FIG. 4, the relatively non-emissive material 34 is applied to the emissive element 28 by using a plasma arc spray torch 39 or equivalents thereof, such as powdered metal spray torches and the like. In particular, the spray torch 39 heats the emissive element to a high or elevated temperature, such as to at least about 1400° F., and preferably to about 4000° F. The spray torch 39 is also capable of dispensing and directing the material 34 towards the emissive element 28. When the emissive element 28 is sufficiently heated, the material forming the emissive element becomes reactive, such that the material 34 forms an immediate bond with the emissive element when the material is applied thereto.

The material 34 is preferably formed of a powdered metal that is relatively nonemissive compared to the emissive element 28. When the material 34 is sprayed from the spray torch 39 and contacts the emissive element 28, the material 34 melts to form a layer or coating on the outer surface of the emissive element. As stated above, the material 34 has a thickness of at least 0.002 inches, and preferably about 0.002–0.010 inches, which is substantially thicker than a layer formed by vapor deposition. In addition, because the emissive element 28 is at an elevated temperature when the material 34 is applied thereto, the resulting layer of material is bonded much more securely to the emissive element compared to conventional methods. While it has been described that the spray torch 39 substantially concurrently heats the emissive element and applies the material 34 thereto, it is also possible to first heat the emissive element 28 to a desired temperature, and then apply the material thereto as a separate step. Further, while it has been described that the material 34 melts when contacting the emissive element 28, it should be understood that the melting step could occur substantially concurrently with the applying step, or that the melting step could be a separate step from the applying step.

After the emissive element 28 has been sprayed or coated with the layer of material 34, the emissive element is disposed in the cavity 35 defined by the separator 32. According to one embodiment shown in FIG. 5, the emissive element 28 is disposed in the cavity 35 of the separator 32 by using a tool 80 having a generally planar circular working surface 81. The tool 80 is placed with the working surface 81 in contact with the emissive element 28 in the cavity 35. The outer diameter of the working surface 81 is slightly smaller than the diameter of the cavity 35 defined by the separator 32. The tool 80 is held with the working surface 81 generally coaxial with the longitudinal axis of the torch 10, and force is applied to the tool so as to impart axial compressive forces to the emissive element 28 and the separator 32 along the longitudinal axis. For example, the tool 80 may be positioned in contact with the emissive element 28 and separator 32 and then struck by a suitable device, such as the ram of a machine. Regardless of the specific technique used, sufficient force should be imparted so as to position the emissive element 28 in the cavity 35 of the separator 32 such that the inner end face 30 of the emissive element is separated from the separator only by the material 34. In one embodiment, the compressing action of the emissive element 28 also results in the emissive element and the separator 32 being slightly deformed radially outwardly such that the emissive element 28 is tightly gripped and retained by the separator in a surface-to-surface relationship.

Also during this process is the application of heat to the emissive element 28 and separator 32 assembly. In particular, the heating process includes heating the emissive element 28 and the separator 32 such that the material 34 and the separator are securely bonded together. Preferably, this is achieved by heating the emissive element 28 and separator 32 assembly to approximately the melting temperature of the material 34, which according to one embodiment is substantially similar to the material forming the separator. The material 34 and the separator 32 "melt" or fuse together during the heating step such that the two components are securely bonded together. Advantageously, the bond formed between the material 34 and the separator 32 is further strengthened due to the strong bond formed between the material 34 and the emissive element 28. Because of the strong bonds formed between the emissive element 28 and the material 34, and the material 34 and the separator 32, the electrode 40 has a longer life span, improved thermal conductivity, and improved electrical conductivity compared to electrodes formed using press fitting techniques or brazing techniques. Of course, it is possible to use a brazing material in conjunction with the emissive element 28 coated with the material 34 and the separator 32 of the present invention, although it is not necessary.

Figure 6:
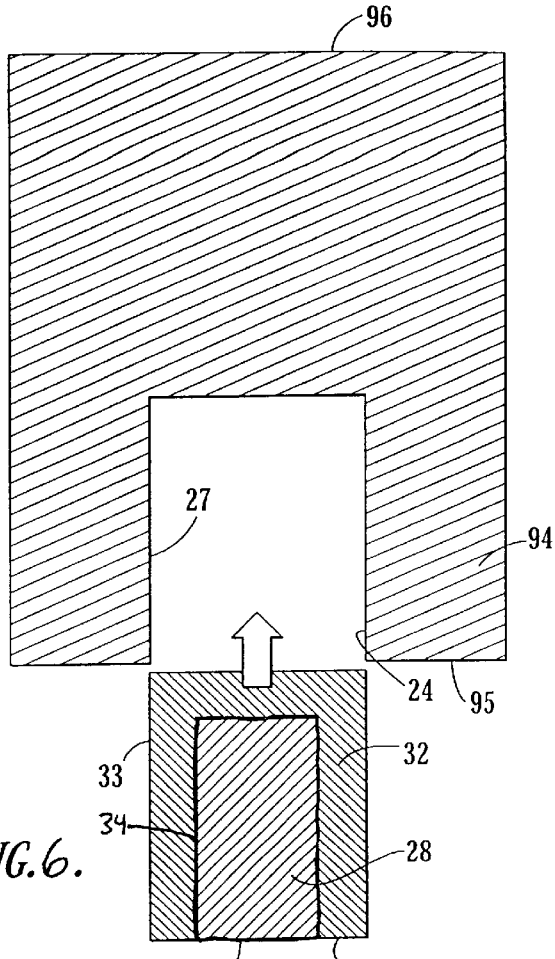

Turning to FIG. 6, a cylindrical blank 94 of copper or copper alloy is provided having a front face 95 and an opposite rear face 96. A generally cylindrical bore is then formed, such as by drilling, in the front face 95 along the longitudinal axis so as to form the cavity 24 as described above. The emissive element 28 and separator 32 assembly is then inserted into the cavity 24, such as by press-fitting, such that the peripheral wall 33 of the separator slidably engages the inner wall 27 of the cavity and is secured thereto in a surface-to-surface, frictional relationship. Although not shown, it is also possible to use a brazing material in the cavity 24 when positioning the emissive element 28 and separator 32 assembly therein.

Figure 7:
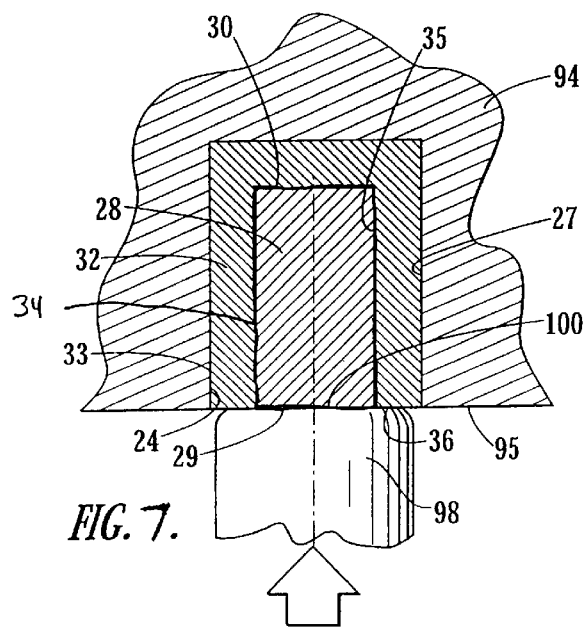

According to one embodiment shown in FIG. 7, a tool 98 having a generally planar circular working surface 100 is placed with the working surface in contact with the end faces 29 and 36 of the emissive element 28 and separator 32, respectively. The outer diameter of the working surface 100 is slightly smaller than the diameter of the cavity 24 in the cylindrical blank 94. The tool 98 is held with the working surface 100 generally coaxial with the longitudinal axis of the torch 10, and force is applied to the tool so as to impart axial compressive forces to the emissive element 28 and the separator 32 along the longitudinal axis. For example, the tool 98 may be positioned in contact with the emissive element 28 and separator 32 and then struck by a suitable device, such as the ram of a machine. Regardless of the specific technique used, sufficient force is imparted so as to cause the emissive element 28 and the separator 32 to be deformed radially outwardly such that the emissive element is tightly gripped and retained by the separator, and the separator is tightly gripped and retained by the cavity 24, as shown in FIG. 8.

FIG. 8 also shows the addition of heat to the cylindrical blank 94, which results in improved properties and life span of the electrode. The heating process can occur after the emissive element 28 and separator 32 assembly has been positioned in the metallic holder or blank 94. The heating process could also be performed after further machining steps are performed on the cylindrical blank, as described below. The exact heating process is dependent on the materials used in the emissive element 28, the separator 32, the material 34 applied to the emissive element, and any brazing materials.

FIGS. 9 and 10 show greatly enlarged views of the emissive element 28, the material 34 applied thereto, and the separator 32 before and after the heating and pressing steps as seen along line 9—9 of FIG. 8. Specifically, FIG. 9 shows the three materials adjacent one another, wherein the broken line represents the previously formed bond between the emissive element 28 and the material 34 discussed above. FIG. 10 shows the same view as in FIG. 9, but after the heating and pressing steps. As can be seen, the material 34 and the separator 32 form a strong bond therebetween, which is preferably formed by heating the material 34 approximately to its melting temperature such that the material 34 and the separator 32 "melt" or fuse together, or form a type of diffusion bond therebetween, such that the two components are securely bonded together. The bond between the separator 32 and the material 34 is represented by the broken line. Also, the bond most easily occurs when the separator 32 and the material 34 are formed from substantially similar materials, although this is not required.

Referring back to FIG. 3, a cross-sectional view of a completed electrode according to the present invention is shown. To complete the fabrication of the holder 16, the rear face 96 of the cylindrical blank 94 is machined to form an open cup-shaped configuration defining the cavity 22 therein. Advantageously, the cavity 22 includes an internal annular recess 82 which defines the cylindrical post 23 and coaxially surrounds portions of the separator 32 and emissive element 28. In addition, the internal annular recess 82 includes an internal surface 83. In other words, the internal annular recess 82 is formed, such as by trepanning or other machining operation, to define the cylindrical post 23.

The external periphery of the cylindrical blank 94 is also shaped as desired, including formation of external threads 102 at the rear end 19 of the holder 16. Finally, the front face 95 of the blank 94 and the end faces 29 and 36 of the emissive element 28 and separator 32, respectively, are machined so that they are substantially flat and flush with one another.

FIG. 11 depicts an end elevational view of the holder 16. It can be seen that the end face 36 of the separator 32 separates the end face 29 of the emissive element 28 from the front face 20 of the holder 16. The end face 36 is annular having an inner perimeter 104 and an outer perimeter 106. The separator 32 serves to discourage the arc from detaching from the emissive element and becoming attached to the holder 16.

Thus, the present invention provides an electrode 14 for use in a plasma arc torch and a method of making an electrode wherein the emissive element 28 receives an application of the relatively non-emissive material 34 before being positioned in the cavity 35 of the separator 32. The material 34 and the emissive element 28 form a strong bond therebetween. And when the coated emissive element 28 is positioned in the separator 32 and heated such that the material 34 and the separator melt or bond together, the resulting bonds between the emissive element 28 and material 34, and between the material 34 and the separator 32 provide superior strength and extended life span to the electrode compared to conventionally formed electrodes.

While the invention has been explained by reference to certain preferred embodiments thereof, and while these embodiments have been described in considerable detail, it will be understood that the invention is not limited to the described embodiments. Modifications and substitutions of equivalents may be made without departing from the scope of the invention as set forth in the appended claims.

That which is claimed:

1. A method of coating an emissive element for use in a plasma arc torch, the emissive element having an outer surface, the method comprising:
    heating the emissive element such that at least a portion of the outer surface of the emissive element becomes reactive;
    applying a relatively non-emissive material to the heated and reactive outer surface of the emissive element;
    allowing the relatively non-emissive material to melt against the outer surface of the emissive element; and
    allowing the emissive element and relatively non-emissive material coated thereon to cool so that the relatively non-emissive material and the outer surface of the emissive element are securely bonded together.

2. A method according to claim 1, wherein the heating step includes heating the emissive element to at least 1400° F.

3. A method according to claim 1, wherein the heating step includes heating the emissive element such that substantially all of the outer surface of the emissive element becomes reactive.

4. A method according to claim 1, wherein the applying step comprises spraying a material on substantially all of the outer surface of the emissive element, the material being selected from the group consisting of silver, gold, platinum, rhodium, iridium, palladium, nickel, aluminum, and alloys thereof.

5. A method according to claim 4, wherein the applying step comprises spraying the material in a powdered form.

6. A method according to claim 4, wherein the applying step includes spraying the material from a spray torch during the heating step.

7. A method according to claim 4, wherein the applying step includes applying the relatively non-emissive material having a thickness of about 0.002–0.010 inches to the outer surface of the emissive element.

8. A method according to claim 1, wherein the melting step occurs substantially concurrently with the applying step.

9. A method of forming an emissive element for use in a plasma arc torch, the emissive element having an outer surface, the method comprising:
    heating the emissive element to about 4000° F. such that the outer surface of the emissive element becomes reactive;
    spraying a relatively non-emissive material on the heated and reactive outer surface of the emissive element to form a layer having a thickness of at least 0.002 inches;
    allowing the relatively non-emissive material to melt against the heated and reactive outer surface of the emissive element upon contact therewith; and
    allowing the emissive element and relatively non-emissive material coated thereon to cool so that the relatively non-emissive material and the outer surface of the emissive element are securely bonded together.

10. A method according to claim 9, wherein the spraying step includes spraying a material selected from the group consisting of silver, gold, platinum, rhodium, iridium, palladium, nickel, aluminum, and alloys thereof.

11. A method of forming an electrode for use in a plasma arc torch, the method comprising:
    heating an emissive element having an outer surface such that at least a portion of the outer surface of the emissive element becomes reactive;
    applying a relatively non-emissive material to the heated and reactive outer surface of the emissive element;
    allowing the relatively non-emissive material to melt against the outer surface of the emissive element and be securely bonded thereto;
    positioning the emissive element in a cavity defined by a relatively non-emissive separator such that the cavity is substantially filled by the emissive element; and
    bonding the emissive element to the relatively non-emissive separator.

12. A method according to claim 11, wherein the heating step includes heating the emissive element to at least 1400° F.

13. A method according to claim 11, wherein the heating step includes heating the emissive element such that substantially all of the outer surface of the emissive element becomes reactive.

14. A method according to claim 11, wherein the applying step comprises spraying a material on substantially all of the outer surface of the emissive element, the material being selected from the group consisting of silver, gold, platinum, rhodium, iridium, palladium, nickel, aluminum, and alloys thereof.

15. A method according to claim 14, wherein the applying step comprises spraying the material in a powdered form.

16. A method according to claim 14, wherein the applying step includes spraying the material from a spray torch during the heating step.

17. A method according to claim 14, wherein the applying step includes applying the relatively non-emissive material having a thickness of about 0.002–0.010 inches to the outer surface of the emissive element.

18. A method according to claim 11, wherein the melting step occurs substantially concurrently with the applying step.

19. A method according to claim 11, wherein the bonding step includes heating the emissive element and separator such that the relatively non-emissive material and separator are securely bonded together.

20. A method according to claim 19, wherein the bonding step includes heating the relatively non-emissive material to the melting temperature thereof.

21. A method according to claim 11, wherein the positioning step includes positioning the emissive element in a cavity defined by a relatively non-emissive separator that is formed of a material selected from the group consisting of silver, gold, platinum, rhodium, iridium, palladium, nickel, aluminum, and alloys thereof.

22. A method according to claim 11, wherein the applying step includes applying a relatively non-emissive material that is substantially similar to the material forming the separator.

* * * * *